Patented Apr. 5, 1927.

1,623,442

UNITED STATES PATENT OFFICE.

ELLIS ROBERTS, OF EAST PALESTINE, OHIO.

BUILDING BLOCK.

No Drawing.  Application filed June 22, 1925. Serial No. 38,921.

This invention relates to building blocks in general and includes all types of hollow or solid blocks, tiles, bricks, and the like for building or other purposes. The invention has for its object the use of certain materials in the manufacture of these articles, which will hereinafter be included under the general heading of blocks, whereby articles of relatively light weight, water and fire proof, and susceptible of receiving nails and the like are produced out of cheap and readily obtainable material.

These articles of manufacture are made from a proper combination of what is ordinarily called crushed burnt slate and saw dust, cement and water. The slate which I prefer is composed of approximately 63% silica, 34% aluminum oxide, and 2% iron oxide, but the exact ingredients of the slate are not a material part of my invention. With this slate I combine a certain amount of saw dust and when desired some coloring matter, and also water proofing substance, particularly on the face of the blocks.

While I do not wish to confine myself to the exact proportions of the various substances specified herein, yet I prefer in making these blocks to use two parts of crushed burnt slate and one part of hardwood saw dust, and one part of cement with a suitable amount of water, and if desired, a small quantity of powdered "Medusa." This "Medusa" may be omitted or may be used only in processing the surface of the blocks in order to produce a water proof surface. Coloring matter may be added as desired. The "Medusa" which I refer to is calcium stearate, being a soluble salt of stearic acid.

The mixture is made and processed in the ordinary manner for making artifical stone.

As a modification I make the main body of the blocks of crushed slate and sawdust and cement, and this I face with a cementitious layer of crushed burnt slate and, if desired, "Medusa." This provides a light block which will receive nails and which is impervious to the weather.

I claim as my invention:

1. A block comprising a mixture of about two parts of crushed burnt slate, one part wood saw dust, and one part of Portland cement and water.

2. A block comprising a mixture of about two parts of crushed burnt slate, one part wood saw dust, and one part of Portland cement and water, and a small amount of calcium stearate.

In testimony whereof, I hereunto set my hand.

ELLIS ROBERTS.